United States Patent [19]
Sehier et al.

[11] Patent Number: 5,933,467
[45] Date of Patent: Aug. 3, 1999

[54] MULTIRATE RECEIVE DEVICE AND METHOD USING A SINGLE ADAPTIVE INTERPOLATION FILTER

[75] Inventors: Philippe Sehier, Levallois; Cyril Bertrand, Paris, both of France

[73] Assignee: Alcatel N.V., BH Rijswijk, Netherlands

[21] Appl. No.: 08/609,237

[22] Filed: Mar. 1, 1996

[30] Foreign Application Priority Data

Mar. 2, 1995 [FR] France .................................. 95 02429

[51] Int. Cl.⁶ .............................. H04B 1/10; H04L 25/08
[52] U.S. Cl. ........................................... 375/350; 375/346
[58] Field of Search ........................... 364/724.1, 724.11; 375/344, 346, 348, 350

[56] References Cited

U.S. PATENT DOCUMENTS

| | | | |
|---|---|---|---|
| 4,856,030 | 8/1989 | Batzer et al. | 375/354 |
| 5,343,496 | 8/1994 | Honig et al. | 375/342 |
| 5,612,975 | 3/1997 | Becker et al. | 375/319 |

FOREIGN PATENT DOCUMENTS

| | | |
|---|---|---|
| 0340978A3 | 11/1989 | European Pat. Off. |
| 0466434A2 | 1/1992 | European Pat. Off. |

OTHER PUBLICATIONS

B. R. Ghosh et al, "Asynchronous adaptive equialization in voiceband data modems", ICASSP–92: 1992 IEEE International Conference on Acoustics, Speech and Signal Processing, (Cat. No. 92CH3103–9), San Francisco, CA, USA Mar. 23–26, 1992, vol. 4, Mar. 1992, pp. 485–488, vol. 4.

K. Watanabe, "Adaptive matched filter and its significance to anti–multipath fading", IEEE International Conference on Communications '86. ICC '86, Integrating the World Through Communications, Conference Record (Cat. No. 86CH2314–3), Canada, Jun. 22–25, 1986, vol. 3, pp. 1455–1459.

*Primary Examiner*—Young T. Tse
*Attorney, Agent, or Firm*—Sughrue, Mion, Zinn, Macpeak & Seas, PLLC

[57] ABSTRACT

A device for receiving a source digital signal transmitted at one or more source symbol frequencies $F_s$ samples a received analog signal transposed into the baseband and delivers an entirely demodulated sample signal. The sampling frequency $F_e$ complies with the generalized sampling condition. A single filter module filtering the sampled signal comprises a digital filter controlled by a filter coefficient vector. The filter coefficients are determined according to a determination criterion allowing for the ratio of the sampling frequency $F_e$ to the source frequency $F_s$, to interpolate the sampled signal, and for an analysis of the transmission path, in order to limit interference introduced by the path.

19 Claims, 6 Drawing Sheets

MULTIRATE RECEIVE DEVICE AND METHOD USING A SINGLE ADAPTIVE INTERPOLATION FILTER

BACKGROUND OF THE INVENTION

1. Field of the Invention

The field of the invention is that of receiving digital signals in devices designed to receive signals transmitted at different source symbol frequencies. The invention concerns in particular multirate modems used in satellite or microwave links, for example.

Accordingly, the invention finds applications in many fields, both civil and military, where it is necessary to receive signals transmitted at at least two different source symbol frequencies.

2. Description of the Prior Art

In an increasing number of applications modems are required to be able to handle a plurality of data rates. In particular, this feature is required for most satellite transmission applications. For example, the IBS (International Business Systems) standard requires modems to be capable of handling a large number of data rates, from 64 kbps up to 2 Mbps.

This requirement for data rate agility naturally increases the complexity of the modems. The transmit and receive filters, whether analog or digital, are no longer fixed but must be variable to track the data rate.

It is also necessary to generate a plurality of clocks that are synchronous or quasi-synchronous with each of the data rates used. Quartz crystal voltage-controller oscillators (VCXO) used in fixed rate modems have to be replaced with much more complex frequency synthesizer devices.

There are already at least three prior art multirate receiver architectures intended to meet these requirements.

Figure 1:
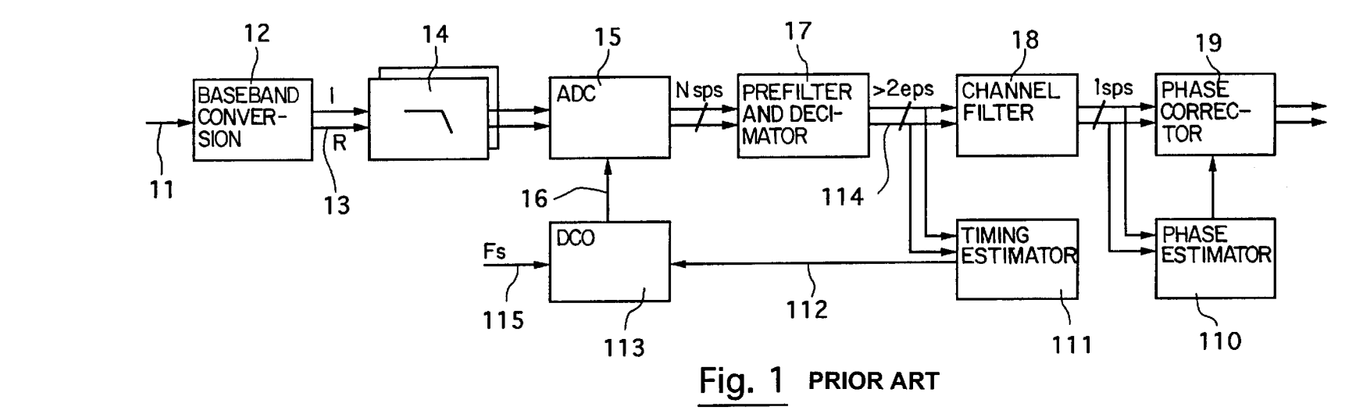
FIGS. 1 through 3 show three block diagrams of prior art receive devices, respectively corresponding to a conventional digital modem, a quasi-synchronous modem and an asynchronous interpolation modem, already commented on in the preamble to this description.

FIG. 1 shows a first of these, in the form of a conventional digital modem.

The received signal 11 is first transposed into the baseband by a module 12 supplying in-phase and quadrature signals 13. The in-phase and quadrature signals 13 are then fed to an analog low-pass filter 14. The complex envelope is filtered by means of a bank of analog filters. These are anti-aliasing filters preceding sampling.

The filtered signal is sampled by an analog-digital converter module 15: the filtered complex envelope is sampled using a clock 16 at a frequency which is a multiple of the symbol frequency, synchronized in phase to the received signal. The samples obtained are then digitized by a converter A pre-filter and decimator module 17 attenuates out-band interference and applies decimation that is varied according to the data rate in order to reduce the oversampling ratio at the input of the channel filter to an integer value that is usually between 2 and 4, as required by the timing estimator.

The channel filter 18 applies the matched filtering needed to obtain good error rate performance. The criterion for optimizing this filter is usually the best compromise between residual intersymbol interference and the noise power at its output.

The filtered signal is passed to a module 19 which corrects its phase in accordance with data supplied by a carrier phase estimator module 110. The phase error is estimated from the channel filter output signal and corrected. The carrier phase estimation and correction techniques are outside the scope of the invention and for this reason will not be described here.

The samples from the pre-filter (or possibly the channel filter) are used in a timing estimator module 111 to estimate the time shift of the received signal 11 relative to the receiver reference (modulo the symbol time). The estimate is filtered and then passed (112) to the oscillator 113, the frequency of which is controlled digitally. Various timing estimation algorithms can be used. Their common feature is that they require an oversampling ratio of the input signal 114 of at least 2.

The digitally controlled oscillator 113 has to supply a set of frequencies 115 that are multiples of the data rate used. It also has a frequency modulation input 112 controlled by the timing estimator 111 for slaving the phase of the clock to the optimal pointing time.

In this type of structure, the number of analog filters in the module 14 depends on the specifications of the interference to be allowed for and whether there is a pre-filter or not.

In a slightly different embodiment the transposition into the baseband can be effected in the digital domain rather than the analog domain. In this case this operation is naturally carried out after analog-digital conversion.

Figure 2:
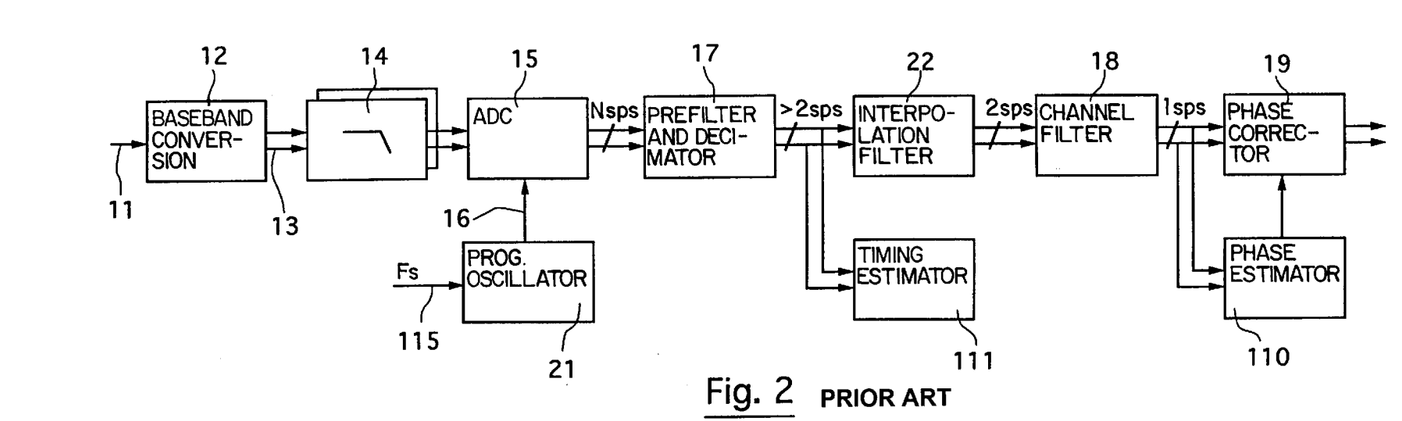

In a second type of prior art modem, shown in FIG. 2, the sampling clock frequency is variable according to the data rate but it is not synchronized in phase. These modems are known as quasi-synchronous interpolation modems. The sampling frequency usually adopted is of the type $qF_s+\epsilon$ where $F_s$ is the symbol frequency, q is the integer oversampling ratio and $\epsilon$ is a very small frequency shift, calculated according to the frequency shift specifications of the transmit and receive oscillators.

The modules 12, 14, 15, 17 through 111 are similar to those in FIG. 1 and will not be described again. The essential difference is that the oscillator 21 is no longer controlled in phase by the estimator 111. In other words, this architecture does not have any feedforward loop It has the advantage of eliminating the frequency control input of the oscillator.

The theory of this type of architecture is explained in detail in the article "Digital Filter and Square Timing Recovery" by H. Meyr and M. Oerder (IEEE Transactions on communications—vol. 36, n° 5, May 1988).

In this architecture, the sampling error is corrected using a digital interpolation filter 22 controlled by the timing estimate 111. Suitable interpolation filters are described by Bucket and Moeneclaey in the article "Symbol synchronizer performance affected by non-ideal interpolation in digital modems" ("Performance de la synchronisation symbolique affectée par une interpolation non-idéale dans les modems numériques") ICC 94, p. 929 (paper category: synchronization; performance of digital receiver algorithms).

The major drawback of the two architectures described above is that they use a variable frequency oscillator which is a complex, fragile and costly device, especially if it is required to change frequency fast and in small steps.

A third type of modem that may be considered is known as an asynchronous interpolation modem.

Figure 3:
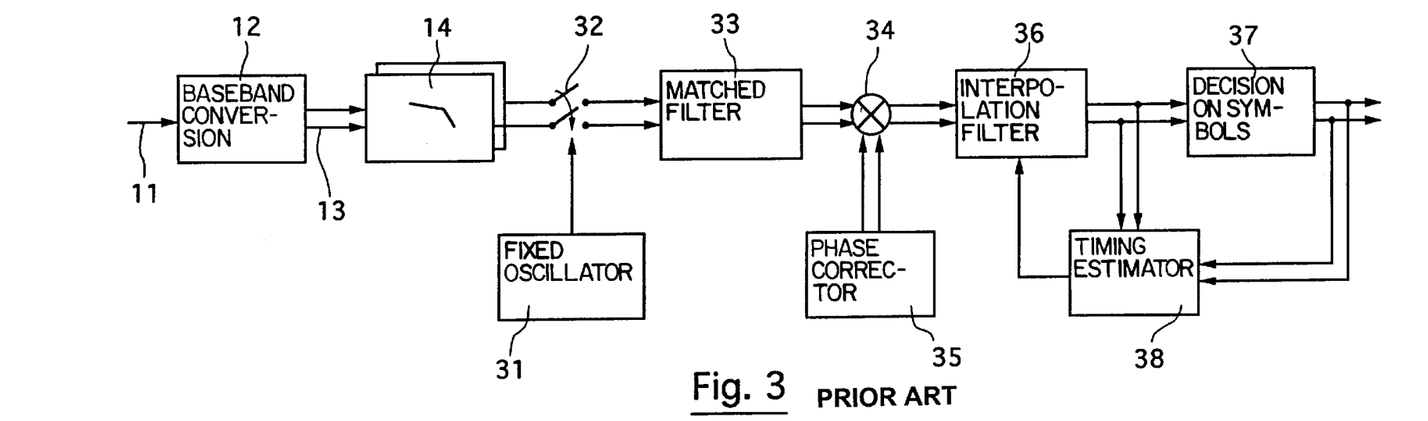

FIG. 3 is a generic block diagram of a modem of this kind. The received signal 11 is transposed into the baseband (12) and then passes through an anti-aliasing filter 14. A sampling clock 31 with a fixed sampling period Ts controls a sampler 32 which feeds samples to a matched filter 33. The phase is then corrected (34) under the control of a phase correction module 35.

Finally, the samples are fed through an interpolation filter 36 to a symbol decision module 37. The interpolation filter 36 is controlled by a timing estimator module 38 connected to the outputs of the interpolation filter 36 and the decision module 37.

An architecture of this type, very similar to that of the second type, is described in the article by Bucket already mentioned. The main advantage of this architecture is that the sampling oscillator 31 operates at a fixed frequency. This greatly simplifies the clock generator devices.

In the general case the oversampling ratio (X) becomes a fractional number, X corresponding to the ratio of the sampling frequency to the symbol frequency. The operation of the interpolator 36 is slightly modified as compared to the previous type interpolator (a detailed description is provided in the Bucket article)

In this structure the choice of the oversampling ratio at the interpolator input is the result of a compromise between the complexity of the interpolator, that of the channel filter and the required level of performance. An oversampling ratio greater than 4 enables the use of very simple first order (linear) interpolation with minimal performance degradation, whereas an oversampling ratio close to 2 requires a much more complex interpolator. On the other hand, the computation power required of the channel filter, which is proportional to the oversampling ratio at its output, increases when that of the pre-filter is reduced.

These asynchronous interpolation modems thus have the advantage of using a fixed oscillator. On the other hand, they do have a few drawbacks. In particular, they require a high oversampling ratio, always greater than 2. Thus for a simple (first order) interpolator to be usable, the oversampling ratio at the interpolator input must be at least 4, which requires high signal sampling frequencies, which is costly in high data rate applications.

The interpolator 36 is intrinsically a sub-optimal device and degrades system performance.

What is more, the various filters employed require a high computation capacity, leading to a large size (silicon surface area, for example), high computation time and/or cost, and therefore high manufacturing cost.

One particular object of the invention is to overcome these various drawbacks of the prior art.

To be more precise, one object of the invention is to provide a multirate receive device using a fixed frequency oscillator of reduced complexity compared to prior art interpolation type devices.

Accordingly, an object of the invention is to provide a device of this kind with computation time, computation capacity, size and/or design and manufacturing cost reduced in comparison with prior art devices.

Another object of the invention is to provide a device of this kind that is more accurate than prior art devices. In particular, one object of the invention is to provide a device of this kind which does not degrade performance in the manner associated with an interpolation filter.

A further object of the invention is to provide a device of this kind capable of operating with an oversampling ratio as low as 2 without degrading performance.

An additional object of the invention is to provide a device of this kind able to operate at very high data rates with the facility to change the data rate fast and accurately.

SUMMARY OF THE INVENTION

These objects, and others that emerge below, are achieved in accordance with the invention by a device for receiving a source digital signal transmitted at one or more source symbol frequencies $F_s$, of the type comprising means for sampling a received analog signal transposed into the baseband delivering an entirely demodulated sample signal, said sampling means operating at a sampling frequency $F_e$ complying with the generalized sampling condition, further comprising a single filter module filtering said sampled signal, said filter module comprising a digital filter controlled by a filter coefficient vector and means for determining said filter coefficients according to a determination criterion allowing for the ratio of said sampling frequency $F_e$ to said source symbol frequency $F_s$, to interpolate said sampled signal, and for an analysis of the transmission path, in order to limit interference introduced by said path.

The signal filtered in accordance with the invention drives digital signal processor means reconstructing the source signal, for example decoder means, means for extracting the source signals by recognition of the structure of a digital transmission frame, or any other means for reconstructing the source digital signal. Such means are not part of the invention and for this reason are not described in more detail.

In accordance with the invention, the interpolation filtering and matched filtering operations are carried out simultaneously by a single filter module. In this way the overall complexity of the filter devices can be reduced, leading to reduced cost and reduced die surface area.

The invention also eliminates the interpolation filter, which has been thought to be necessary in the prior art when the oscillator used has had a single oscillation frequency. This eliminates the performance degradation inherent to interpolation filters.

It should be noted that the invention is not derived in any direct manner from prior art asynchronous interpolation modems, which use two separate filters in succession. The person skilled in the art has always believed that replacing a variable oscillator by a fixed oscillator imposes the need for an interpolator in order to reconstruct the samples with the correct timing. This interpolator must operate at a high frequency. Also, any receiver must include matched filtering means if there is any risk of interference on the transmission channel. In particular it is necessary to filter thermal noise and interfering signals, and to eliminate or at least reduce the effects of intersymbol interference.

In theory the interpolation filtering and matched filtering operations are separate. They are carried out at different timing rates, with different aims and in different ways. There has therefore been nothing to indicate to the person skilled in the art that they should be combined in one and the same filter. To the contrary, the literature shows clearly that two filters are needed. The person skilled in the art also regards each of these two filters as a complex device, and has therefore implemented them independently.

Said determination means advantageously comprise means for calculating a plurality of sets of filter coefficient vectors employed during initialization of said device, said sets of vectors being stored in storage means, each set of vectors corresponding to a given source symbol frequency $F_s$, and means for selecting the most effective vector from the set of vectors corresponding to the source symbol frequency $F_s$ of the signal being received, according to the value of the ratio $F_e/F_s$ and an estimate $\delta\tau$ of the transmission time-delay of said source signal.

Thus, during an initialization phase, a plurality of coefficient vectors are determined for each source symbol frequency. In normal operation, when a symbol frequency is fixed, the operation of the device is particularly simple and fast: it essentially consists in selecting the best coefficient vector to apply from the corresponding set of vectors.

Note, however, that other techniques for determining the filter coefficients can be used without departing from the scope of the invention. For example, the coefficients can be adaptive (and therefore not fixed at initialization) to track evolution of the transmission path.

Because the coefficient vectors are calculated once and for all, they can be stored in any type of memory means. It is nevertheless advantageous for said storage means to comprise a random access memory (RAM).

These memories are faster than conventional read only memories.

In a preferred embodiment said determination criterion is minimizing the mean square error.

In other words, the criterion chosen is aimed at obtaining the best compromise between the residual intersymbol interference and the noise power at the filter output.

In one specific embodiment said filter module comprises a series of Lt identical filter cells operating in parallel, the outputs of said filter cells being multiplexed to reconstruct the fully demodulated digital signal.

This technique is particularly advantageous since it is based on the use of a plurality of identical simple cells. Because they work in parallel, the timing rate of each cell can be divided by Lt.

Each of said cells preferably filters a portion of said sampled signal having a duration Ts.Lt where Ts is the duration of a symbol of said source signal, said signal portions being shifted relative to each other by a time Ts, when the requirement is to deliver one sample per symbol at the output of the filter module.

The value of Lt is conventionally between 5 and 10.

Said cells advantageously comprise accumulator and multiplier means.

In another specific embodiment said filter module can comprise memory means into which said sampled signal is introduced, a portion of said sampled signal being received and filtered every Ts where Ts is the duration of a symbol of said source signal.

Said determination means preferably also determine the number of coefficients forming each of said filter coefficient vectors.

As will emerge below, it is desirable for the number of accumulations needed to obtain a filtered sample to vary in accordance with the estimated transmission time and the shift due to asynchronous sampling. The number of coefficients included in a vector may nevertheless be fixed and padded out with zeros, if necessary.

Said determination means advantageously also determine the duration of the signal portion filtered by said filter module. In this case, said determination means can modify the number Lt of cells used.

In a preferred embodiment of the invention said filter module comprises:
storage means comprising $N_j$ filter coefficient vectors, and
Lt identical filter cells operating in parallel, and wherein said determination means carry out the following calculations:

$A(n)=A(n-1)+F_e/F_s+\delta_\tau(n).Fe$ $k_1(n)=VI(A(n))$ $k_j(n)=k_1(n-L_\tau)+1$ $J(n)=VI(N_j.(A(n)-k_1(n)))$ where:
A(n) is the value updated on each symbol a(n),
$[k_j(n), k_1(n)]$ defines the range of the samples of said sampled signal processed to determine the decision variable relating to the symbol a(n), J(n) is the number of the coefficient vector to be used to determine the decision variable relating to the symbol a(n), and $\delta\tau$ is an estimate of the relative timing corresponding to the algebraic difference between two successive timing estimates.

Said single filter module is advantageously controlled by a timing signal delivered by a timing estimator fed with said sampled signal.

Said timing estimator preferably comprises filter means similar to said filter module and using the same filter coefficient vectors.

It is clear that this technique limits the complexity of the device. In particular the filter module and the timing estimator can use the same coefficient vectors stored in the same storage means.

Because the timing delay varies relatively slowly, said timing estimator can be used periodically, at time intervals that are relatively widely spaced compared to the symbol time Ts.

This time lapse can be in the order of a few hundred symbol times, for example.

In accordance with an advantageous feature of the invention, a single clock signal, corresponding to the sampling clock, controls all of the components forming said filter modules and/or said timing estimator.

The invention also concerns a method of receiving a source digital signal transmitted at a source symbol frequency $F_s$ selected from a plurality of possible source symbol frequencies, of the type comprising steps of sampling a received analog signal transposed into the baseband and delivering a sampled signal and of decoding to reconstruct said source digital signal, said sampling being carried out at any fixed sampling frequency $F_e$ complying with Shannon's sampling theorem, which method uses a single filter to filter said sampled signal and supplying a filtered signal to said decoder means, comprising:

an initialization step of determining a series of sets of filter coefficient vectors, each set corresponding to a given source symbol frequency $F_s$, and each vector corresponding to a given receive situation, and a step of filtering a received source signal, consisting in choosing the filter coefficient vector most accurately synchronized to correct the effects of the transmission path and/or of asynchronous sampling from the set of vectors corresponding to the source symbol frequency of said source signal.

Said initialization step preferably comprises the following steps:

determining a template of the transmission path corresponding to interfering signals likely to be encountered, and for each source symbol frequency $F_s$:
choosing a series of timing error estimate values $\tau$,
for each timing error estimate value:
formal calculation of the filter function of the transmission path, excluding said single filter,
calculating the noise at the input of said single filter,
calculating the square error, in a quadratic form as a function of the coefficients of said single filter,
differentiating said quadratic form and searching for the corresponding zeros, and
storing the coefficient vectors corresponding to said zeros.

Other features and advantages of the invention will emerge more clearly from a reading of the following description of one preferred embodiment of the invention given by way of non-limiting, illustrative examples and from the appended drawings.

DETAILED DESCRIPTION OF THE PREFERRED EMBODIMENT

As previously indicated, the essential feature of the invention is that it proposes a multirate receive device in which the interpolation filter and channel filter functions are provided by a single filter. The overall complexity of the filter function is therefore reduced by this elimination of a separate interpolation function. This benefit is obtained at the cost of a slight increase in the complexity of the channel filter compared to the prior art.

This association of interpolation filtering and matched filtering imposes an additional constraint on overall filter optimization. The interpolation-matched filter handles the following tasks:

- optimal interpolation on the basis of the value provided by the timing estimator,
- selective filtering of noise (thermal noise and interfering signals),
- elimination of intersymbol interference (filtering matched to the entire channel).

Figure 4:
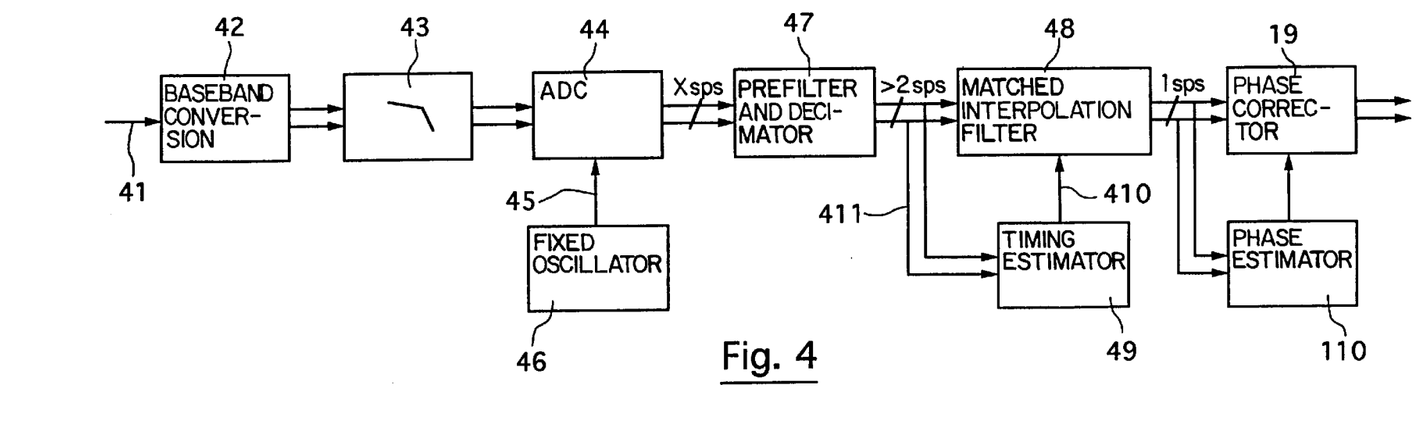
FIG. 4 shows a block diagram of a receive device of the invention comprising a single interpolation filter and channel filter module.

FIG. 4 is a diagrammatic representation of a receive device, such as a multirate modem, of the invention. The conventional modules already described with reference to FIGS. 1 through 3 are not described again.

The received signal 41 is transposed into the baseband (42), filtered by an analog low-pass filter 43 and sampled by an analog-digital converter 44 controlled by a fixed sampling signal 45 supplied by a fixed oscillator 46. The sampling signal can have any frequency provided that it complies with the "generalized sampling condition".

The frequencies meeting this condition, whereby the continuous signal and its sampled version carry exactly the same information, are those belonging to the set Df defined as follows for a bandpass $[f_m, f_M]$ type signal $x(t)$:

$$Df = [2f_M/(n_o+1); 2f_m/n_o] \cup [2f_M/n_o; 2f_m/(n_o-1)] \cup [2f_M/n_o-1): 2f_m/n_o-$$

$$2)] \cup \ldots \cup [2f_M/2; 2f_m] \cup [2f_M; +\infty]$$

where $$n_0 = E[f_m/f_M - f_m)]$$

The samples are therefore delivered at the rate of X samples per source symbol, X being any non-integer real number greater than 1.

These samples are pre-filtered and decimated (47) to reduce the number of samples to a value near but greater than two samples per source symbol.

The samples retained are fed to an interpolation filter and channel filter module 48 of the invention and to a timing estimator module 49, enabling the samples to be synchronized (410) with the transmitted symbol timing.

The single filter module 48 is a digital filter having the following features:

- its interpolation filter function renews its coefficients for each new incoming sample, if necessary,
- its matched filter function provides two sets of coefficients which, convoluted with the filter corresponding to the whole of the channel, comply with the Nyquist criterion.

It is described in more detail below.

The timing estimator 49 preferably has a structure similar to that of the filter module 48. The timing estimator 49 requires four samples per symbol. A single sample per symbol is sufficient at the output of the filter 48. There is no benefit in overloading this main filter by making it run four times as fast, as would be necessary if the samples leaving the filter 48 were fed to the estimator.

Instead the timing is estimated from time to time on a branch line 411 leading to the timing estimator 49. An interpolation filter of the same kind as the main filter on this line produces four filtered and resynchronized samples per symbol, once every Nsymb symbols. The value of Nsymb is typically a few hundred: during the corresponding time lapse the timing delay value varies only slightly.

Subject to the addition of this second occasional filter 49, the overall structure is of the feed-forward type.

Figure 5:
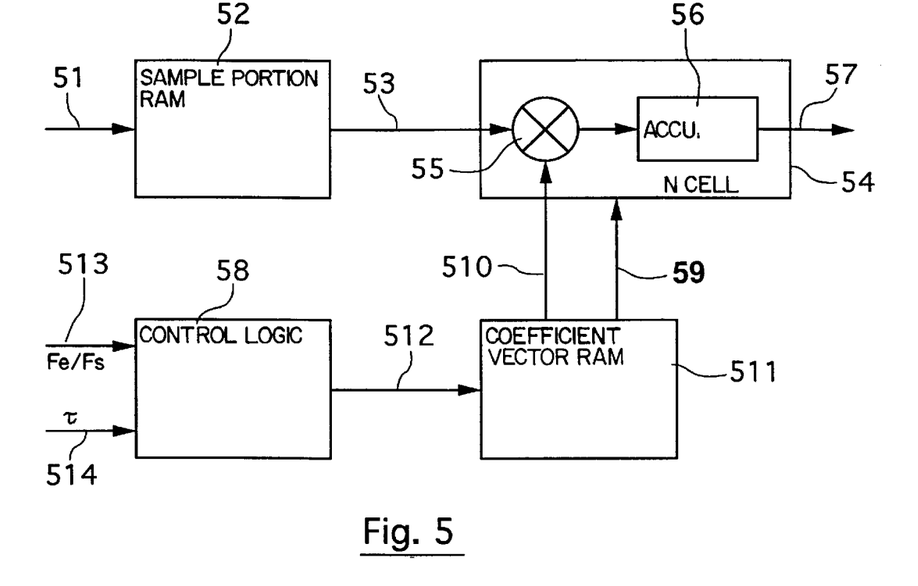
FIG. 5 shows a detailed block diagram of the filter module from FIG. 4.

FIG. 5 shows the general structure of the filter module 48.

The incoming samples 51 from the pre-filter module 47 are stored continuously in RAM 52 at the timing rate at which they arrive. They are extracted (read out) from the RAM in portions. Each sample portion 53 is passed to the filter means 54 which advantageously comprise N identical cells made up of multipliers 55 and accumulators 56. They supply filtered samples 57 which can then undergo source decoding.

In accordance with the invention, the filter module comprises control logic 58 with two functions:

- it sets the format of the sample portions 53, providing information 59 defining the limits of the portions,
- it selects the filter coefficient vector 510 to be used in the filter module, controlling a coefficient vector RAM 511 appropriately (512).

These two functions use two pieces of information:

- the source signal data rate, for example in the form of the ratio $F_e/F_s$ (513),
- a timing estimate τ (514) supplied by a conventional estimator.

The coefficient vectors 510 can be recalculated by the control logic 58. This requires a very high computation capacity, however. It is therefore advantageous for the sets of coefficient vectors to be calculated during an initialization phase. The purpose of the computation logic 58 is then merely to select the best coefficient vector.

Figure 6:
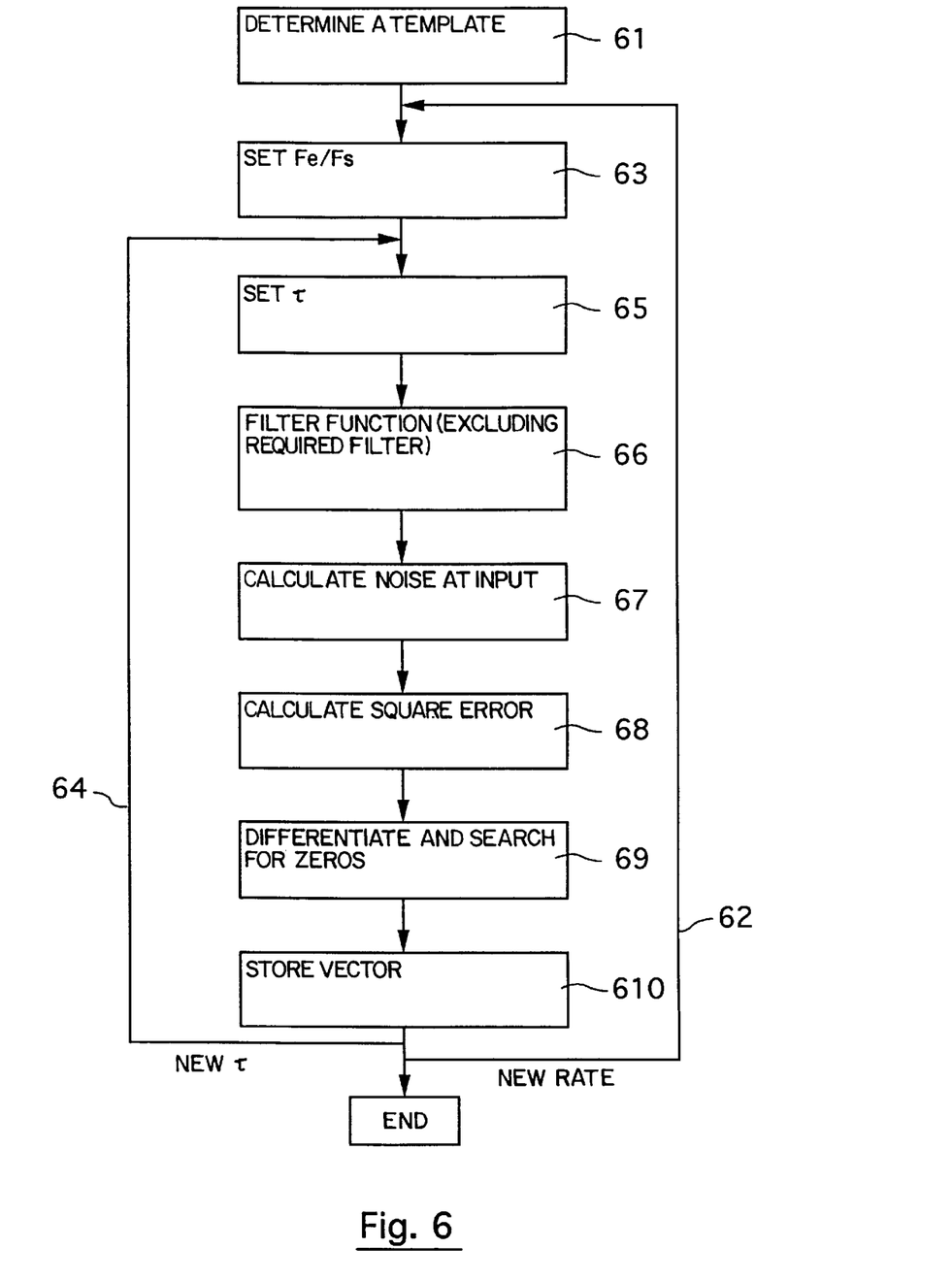
FIG. 6 is a diagram showing the method of calculating the filter coefficients in the filter module of the invention.

FIG. 6 is a diagram showing one example of the method of calculating these coefficients.

Firstly, a channel template is determined (61) corresponding to the interfering signals (whether intentional or not) likely to be encountered. Then, for each data rate $F_s$ to be processed by the device (loop 62), the ratio $F_e/F_s$ is fixed (63), $F_e$ being the fixed sampling frequency.

A set of filter coefficient vectors is calculated for each of these data rates, each vector corresponding to a given value of the timing estimate $\tau$ (loop 64).

A value of $\tau$ is set (65). The values of $\tau$ are advantageously equally distributed across the range [0, 1]. For each of these values:

the filter function of the entire channel, excluding the required filter, is calculated formally (66), the formula of the noise at the input of this filter is calculated (67); in particular, the noise passes through the pre-filter, the square error is calculated (68), for example using the equation given below; this error is expressed in a second order quadratic form as a function of the coefficients of the matched interpolation filter of the invention, the derivative of this quadratic form is calculated (69) and the zeros are searched for, for example by matrix inversion, the coefficient vector corresponding to these zeros is stored (610) in the RAM 511 provided for this purpose.

It is thus clear that the operation of the device amounts to:

selecting a set of vectors according to the value of the ratio $F_e/F_s$, selecting a vector from this set according to the value of the timing estimate $\tau$ and the temporal position of the required interpolated sample.

Calculation techniques that can be used in implementing the invention are now explained.

The received signal can be expressed in the form:

$$r(t) = \sum_{-\infty}^{+\infty} a_k \cdot g(t - \tau(t) - k \cdot T_s) + n(t) \quad (\text{Eq.1})$$

where:

g(t) is the impulse response of all the channel filters: transmit filter, anti-aliasing filter, pre-filter, n(t) is the thermal noise on the output side of all the receive filters: anti-aliasing filter and pre-filter, $a_k$ is the symbol transmitted at time $k.T_s$, $\tau(t)$ is the time-delay of the received signal (assumed to very slowly compared to the symbol frequency).

The decision variable U(n) relating to the symbol $a_n$ is obtained by sampling the output of the receive filter having the impulse response h(t) at time $n.T_s + \tau$ where $\tau$ is the time-delay of the received signal. Adopting continuous-time notation, U(n) can be written:

$$U(n) = \int_{-\infty}^{+\infty} r(t) \cdot h(n \cdot T_s + \tau(n) - t) \cdot dt \quad (\text{Eq.2})$$

When g(t) satisfies the Nyquist criterion, h(t) is the filter matched to g(t) and is expressed by the equation: h(t)=g*(−t). In a more general case, h(t) is chosen to optimize system performance. Usually, h(t) is chosen to obtain the best compromise between the residual intersymbol interference and the noise power at the output of the filter using the 'Minimum Mean Square Error' criterion, for example.

In a digital receiver, the corresponding discrete-time filter algorithm is written:

$$U(n) = \sum_{-\infty}^{+\infty} r(k \cdot T_e) \cdot h(n \cdot T_s + \tau(n) - k \cdot T_e) \quad (\text{Eq.3})$$

where $T_e$ is the sampling period at the channel filter input.

For reasons of practical implementation, the infinite sum must be truncated to a finite number of terms. The algorithm becomes:

$$U(n) = \sum_{k_f(n)}^{k_l(n)} r(k \cdot T_e) \cdot h(n \cdot T_s + \tau(n) - k \cdot T_e) \quad (\text{Eq.4})$$

where $k_f(n)$ and $k_1(n)$ are two integers chosen so that the range $[k_f(n).T_e, k_1(n).T_e]$ contains most of the energy of the function $h(n.T_s - \tau - k.T_e)$.

Let $L_\tau$ (integer) be the truncation length defined so that $[(-L_t/2).T_s, (L_t/2).T_s]$ represents the temporal support of h(t) after truncation. From what has been stated above, it follows that $k_f(n)$ and $k_1(n)$ must be chosen so that:

$$n \cdot T_s + \tau(n) - k_f(n) \cdot T_e \approx \frac{L_t}{2} \cdot T_s \quad (\text{Eq.5})$$

$$n \cdot T_s + \tau(n) - k_l(n) \cdot T_e \approx -\frac{L_t}{2} \cdot T_s$$

Defining A(n) as follows:

$$A(n) = \frac{L_t}{2} \cdot \frac{T_s}{T_e} + n \cdot \frac{T_s}{T_e} + \frac{\tau(n)}{T_e} \quad (\text{Eq.6})$$

$k_e(n)$ and $k_f(n)$ can be chosen as follows:

$$k_1(n) = \lfloor A(n) \rfloor \quad (\text{Eq. 7})$$

$$k_f(n) = k_1(n - L_t) + 1$$

This choice respects the approximate equalities of equation 5 and meets the demand of strictly synchronous filtering.

Rearranging the summation index of equation 4, the following new filter algorithm is obtained:

$$U(n) = \sum_{k=0}^{k_l(n) - k_f(n)} r(-k \cdot T_e + k_l(n) \cdot T_e), \quad (\text{Eq.8})$$

$$h\left(\varepsilon(n) \cdot T - e - \cdot \frac{L_T}{2} \cdot T_s + k \cdot T_e\right)$$

where $\epsilon(n)$ is defined as follows:

$$\epsilon(n) = A(n) - k_1(n) = A(n) - \lfloor A(n) \rfloor \quad (\text{Eq. 9})$$

It is therefore seen that the filter function to be applied depends on the quantity $\epsilon(n)$ included in the range [0, 1]. If the ratio $F_e/F_s$ is not rational, $\epsilon(n)$ can take all values between 0 and 1. For practical reasons it is therefore necessary to limit the possible number of filtering operations. This is achieved by quantifying $\epsilon(n)$ on a finite number of values. If $N_j$ is the number of possible filter functions and $\epsilon_q(n)$ is the quantified value of $\epsilon(n)$ in accordance with the nearest neighbor rule, the following equation applies:

$$\varepsilon_q(n) = \frac{1}{N_j}\left(\lfloor N_j \cdot \varepsilon(n)\rfloor + \frac{1}{2}\right) \quad \text{(Eq.10)}$$

The number J(n) of the set of coefficients to use for symbol $\underline{n}$ is given by the equation:

$$J(n) = \lfloor N_j \cdot \epsilon(n) \rfloor \quad \text{(Eq. 11)}$$

and the corresponding filter algorithm is:

$$U(n) = \sum_{k=0}^{k_l(n)-k_f(n)} r(-k \cdot T_e + k_l(n) \cdot T_e), C_{j(n)}(k) \quad \text{(Eq.12)}$$

where:

$$C_{j(n)}(k) = h\left(\varepsilon_q(n) \cdot T_e - \frac{L_T}{2} \cdot T_s + k \cdot T_e\right) \quad \text{(Eq.13)}$$

In practice the time-delay $\tau(n)$ is estimated by the receiver. Because of the architecture adopted, the value estimated by the receiver is not the absolute value of this time-delay, but rather an estimate of the difference between the timing references of the receiver at times $(n-1)$. $T_s$ and $n.T_s$. This is because the set of coefficients used at time $n.T_s$ is the set which is optimal at time $(n-1).T_s$. If $\hat{\delta}_\tau(n)$ is the estimated difference at time $n.T_s$, the absolute estimate of the time-delay $\hat{\tau}(n)$ at time $n.T_s$ is given by:

$$\hat{\tau}(n) = \sum_{i=-\infty}^{n} \delta_\tau(i) \quad \text{(Eq.14)}$$

It follows from what has been stated above that the number of filter coefficients, which is equal for symbol $\underline{n}$ to $k_1(n)-k_f(n)+1$, is not constant. Since $\delta_\tau(n)$ varies in the range $$\left[-\frac{1}{2F_s}, \frac{1}{2F_s}\right],$$

$\tau(n)$ can vary, after $L_t$ clock pulses, in the range $$\left[-\frac{L_t}{2F_s}, \frac{L_t}{2F_s}\right].$$

As $k_1(n)$ and $k_f(n)$ satisfy the following equations:

$$k_1(n) = \lfloor A(n) \rfloor$$

$$k_f(n) = \left\lceil A(n) - L_t \cdot \frac{F_e}{F_s} - F_e \cdot \sum_{i=n-L_t+1}^{n} \delta_t(i) \right\rceil$$

$(k_1(n)-k_f(n)+1)$ can vary in the range $$\left[\frac{L_t}{2} \cdot \frac{F_e}{F_s}, \frac{3 \cdot L_t}{2} \cdot \frac{F_e}{F_s}\right],$$

with a mean value of $L_t.F_e/F_s$.

Under steady state conditions the contribution of the timing error is negligible and the number of coefficients varies in a much smaller range than that mentioned above. Ignoring the influence of the timing error, the number of coefficients varies between $VI(L_t.F_e/F_s)$ and $VS(L_t.F_e/F_s)$ where VI is the function associating the first lower integer value, also represented [.], and VS is the function associating the first higher integer value, also symbolically represented by [.].

For example, if $F_e/F_s=4.1$ and the value of the truncation length $L_t$ is 8, the number of coefficients alternates between 32 and 33.

For practical reasons it is desirable for the number $N_{coef}$ of non-null coefficients to be constant. We adopt $N_{coef}=VI(L_t.F_e/F_s)$. In this case, the practical filter algorithm becomes:

$$U(n) = \sum_{k=0}^{N_{coef}-1} r(-k \cdot T_e + k_l(n) \cdot T_e) \cdot C_{j(n)}(k) \quad \text{(Eq. 15)}$$

Until now it has been assumed that the sets of coefficients are obtained by truncating and shifting a particular filter function. This method is known to be sub-optimal. Such coefficients have been optimized in the absence of any constraint on their length: they are optimal as infinite impulse response filter coefficients. As soon as they are truncated, they lose their optimal character in the general case. In particular, this method leads to a significant loss of performance if the truncation length is short.

Although this technique can be used, different methods may be adopted. The proposed synthesis method is directed to achieving an optimal compromise between the residual intersymbol interference and the noise power at the output of the filter, subject to the constraint of a finite number of coefficients. In mathematical terms, it may be expressed as follows: find for each quantified value of the difference $\epsilon$, the set of coefficients $C_\epsilon = [c_\epsilon(0), c_\epsilon(1), c_\epsilon(N_{coef}-1)]$ which minimizes the function $J(C_\epsilon)$, defined by:

$$J(C_\varepsilon) = E\left[\left|\sum_{k=0}^{N_{coef}-1} r(-k \cdot T_e + k_1(n) \cdot T_e) \cdot c_\varepsilon(k) - a_n\right|^2\right] \quad \text{(Eq. 16)}$$

This quadratic cost function provides a simple synthesis method. It is equally possible to use a cost function proportional to the error rate or to a limit on the error rate. However, this type of technique does not provide a simple synthesis method.

To summarize, the filter control algorithm giving for each symbol the indices of the first and last samples of the received signal to be used and the number of the set of coefficients to be used is as follows:

$A(n)=A(n-1)+F_e/F_s+\delta\tau(n).Fe$ $k_1(n)=VI(A(n))$ $k_f(n)=k_1(n-L_t)+1$ $J(n)=VI(N_j.(A(n)-k_1(n)))$ where (to recapitulate):

A(n) is the accumulator value at time $n.T_s$, $[k_f(n)=k_1(n)]$ is the range of indices of the samples of the received signal used to determine the decision variable relating to the symbol a(n), J(n) is the number of the set of coefficients used to determine the decision variable relating to the symbol a(n), $N_j$ is the number of sets of coefficients (depending on the oversampling ratio).

The interpolation filter obtained in this way can be implemented using $L_t$ multiplier-accumulator cells, each cell providing one in Lt decision variables. Cell 0 provides $U(L_t)$, cell 1 provides $U(L_t+1)$, and so on.

This structure is possible because the sample vectors used by each cell are disjoint and contiguous. This justifies the choice made in determining $k_f(n)$ and $k_1(n)$.

Figure 7:
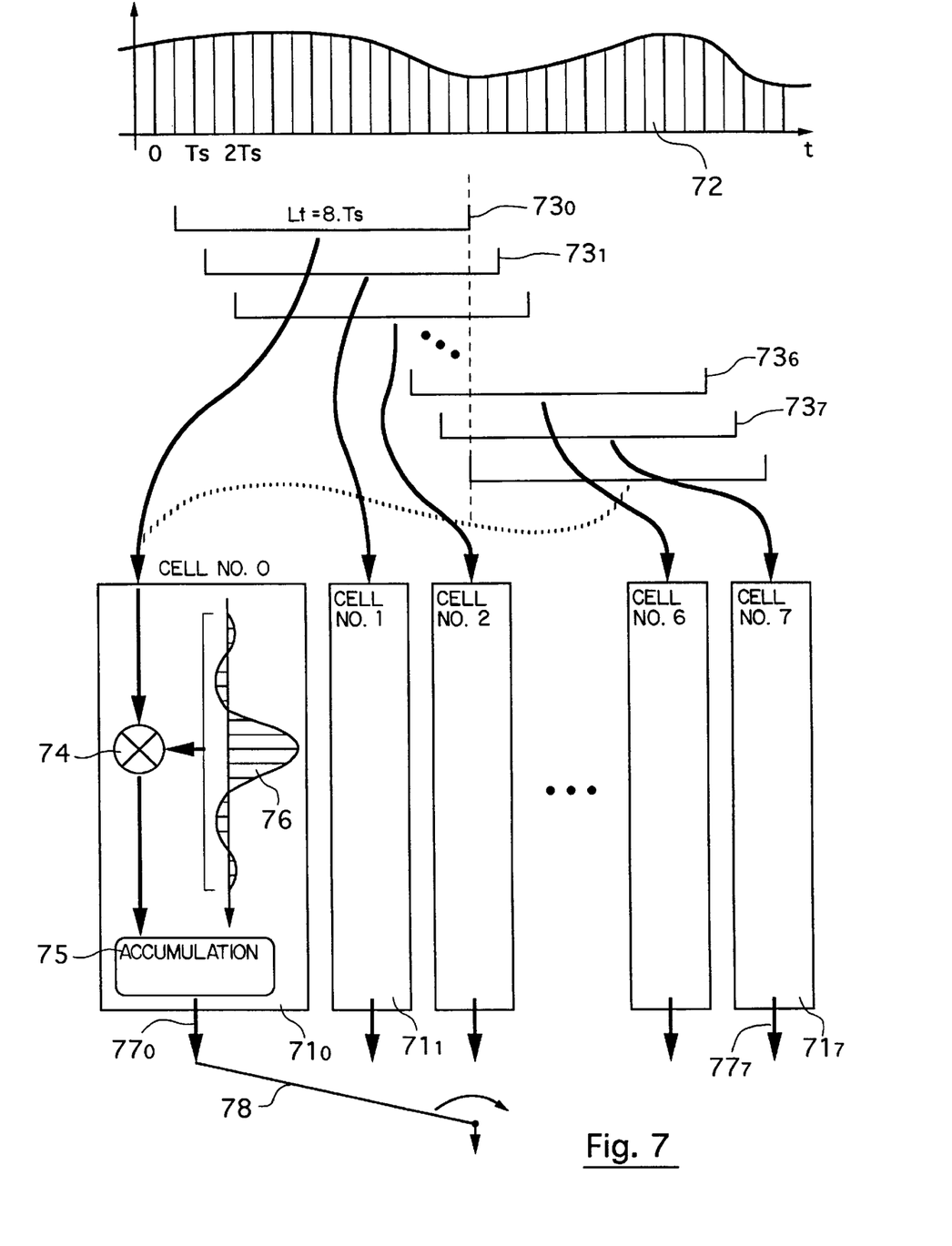
FIG. 7 shows the canonic structure of the filter module from FIG. 4, organized as N parallel cells.

FIG. 7 shows a canonic structure of a filter organized in this way into eight parallel cells $71_0$ through $71_7$.

The unit of time is the symbol time Ts. Lt is the temporal width of each set of coefficients expressed as a multiple of Ts. Lt is therefore an integer, usually 6 or 8.

The signal 72 is sampled at the rate of two samples per symbol.

The overall filter then comprises Lt cells $71_0$ through $71_7$.

Each cell $71_i$ is in fact a digital filter, which filters independently the samples ($73_0$ through $73_7$) delayed by an amount specific to that cell. The samples entering cell number i are delayed on average by the real value i.Ts/Lt, with i varying from 0 through Lt−1.

Each cell $71_0$ multiplies (74) the sample portion $73_0$ by the selected coefficient vector (76) after which the result of the multiplication is accumulated (75).

Every Lt.Ts (corresponding to the temporal length common to the impulse responses of each filter), there are obtained Lt filtered samples $77_0$ through $77_7$ which are demultiplexed by the demultiplexer 78.

Each cell therefore produces a filtered sample every Lt.Ts: at this rate, when the calculation of a filtered sample ends—at the time of the last multiplication-accumulation of an incoming sample by a coefficient of the selected filter—the calculation of the next filtered sample can start at the next incoming sample.

Figure 8:
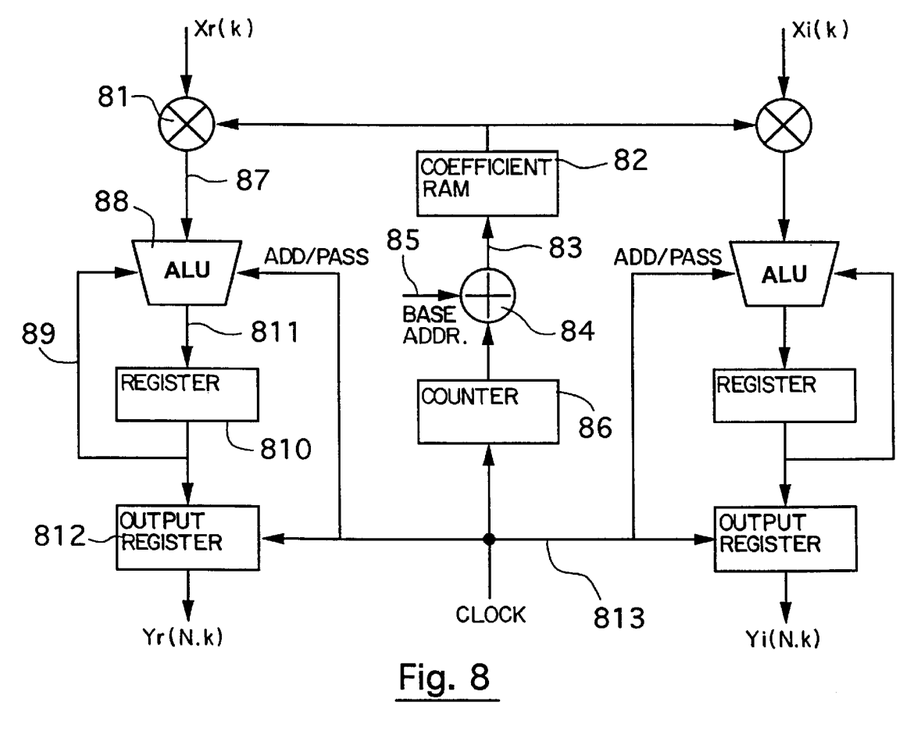
FIG. 8 shows in detail the architecture of a cell from FIG. 7.

The internal structure of a cell of this kind is therefore simply that of a filter whose set of coefficients is chosen by control logic. It is shown in FIG. 8.

The incoming samples comprise a real part $X_r(k)$ and an imaginary part $X_i(k)$ which are processed symmetrically, as is clear from the diagram. For this reason only the processing of the real part is described below.

The sample $X_r(k)$ is multiplied by a coefficient selected in the RAM 82 on the basis of an address signal 83 corresponding to the sum 84 of a base address 85 supplied by the control means corresponding to each set of vectors and the content of an address counter 86.

The result 87 of the multiplication 81 is passed to an arithmetic and logic unit 88 which with a loop 89 accumulates the content of a register 810 containing the output 811 of the ALU 88. The content 810 is passed to an output register 812 which supplies the filtered elements $Y_r(N.k)$.

A single control signal 813 (referred to hereinafter as the "Clock" signal) is required in this structure to orchestrate all of the cell. It is inactive throughout the duration of an accumulation and is active only during a clock pulse to tell all the components concerned that the accumulation has finished:

the address counter 86 is reset to zero, a new base address 85 is loaded, the latest accumulation value is loaded into the output register 812, the ALU 88 passes on the value 87 from the multiplier 81 without carrying out any addition, the accumulator register therefore takes this new value.

Figure 9:
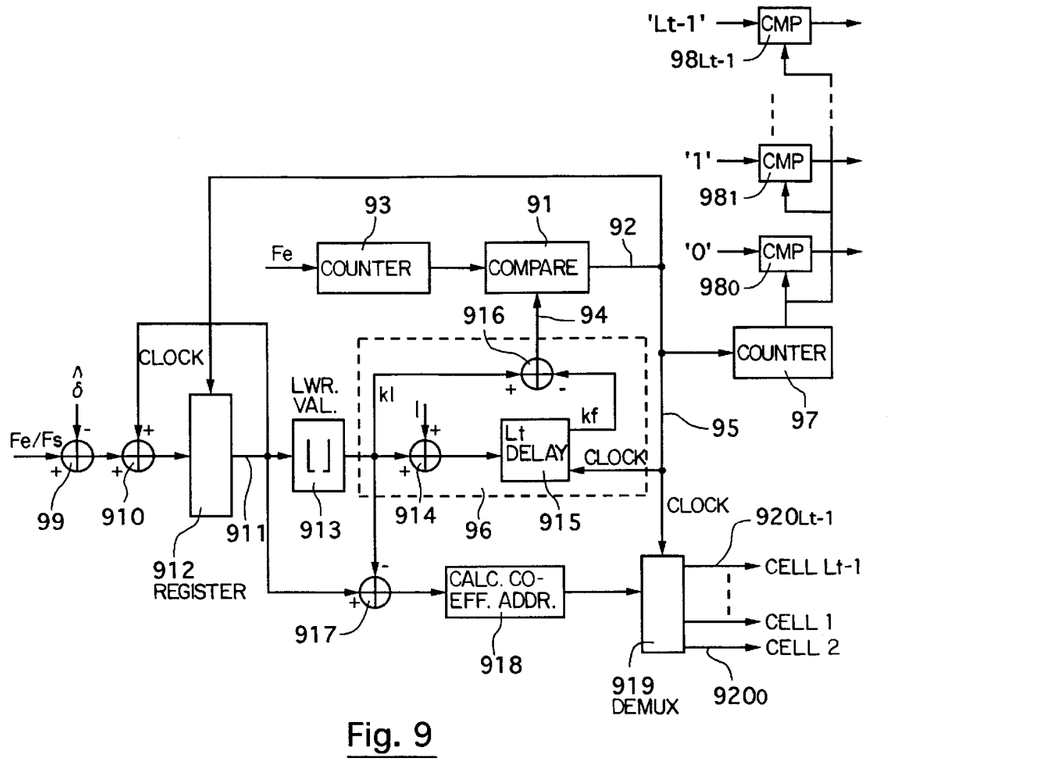
FIG. 9 shows the overall control logic from FIG. 7, common to all the cells.

The architecture of the overall control logic, common to all the cells, can be as shown in FIG. 9. Its essential purpose is to supply to the cells the "clock" signals mentioned above and shown in FIG. 10.

This signal must go to the active state (1) when an accumulation is finished, i.e. when the filter delivers a filtered sample.

A simple way to construct this signal is to use a comparator 91 whose output 92 is in the inactive state if its two inputs are different and goes to the high state (1) otherwise. These two inputs are connected to:

the output of a counter 93 clocked at the sampling frequency $F_e$, a value 94 corresponding to the length of an accumulation (or of a set of coefficients) supplied by a coefficient ramp length generator 96 and refreshed at the slowest timing rate of the "Clock" signal itself.

Except for the ramp counter, all the components of the control logic are invoked only once for each sample outgoing from the filter (under the control of the "Clock" signal).

Figure 10:
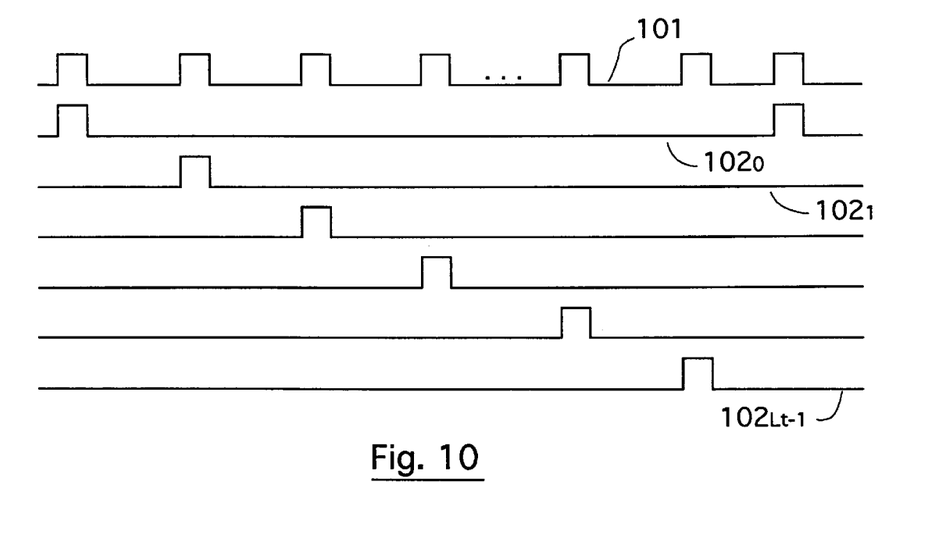
FIG. 10 shows the control signals used in the cell from FIG. 8.

The "Clock" signal 92 is shown in line 101 in FIG. 10. It drives a counter 97 which in turn drives a series of comparators $98_0$ through $98_{Lt-1}$ which deliver the corresponding signals $102_0$ through $102_{Lt-1}$ (FIG. 10).

The control logic also comprises means for selecting the appropriate sets of coefficients. A subtractor 99 calculates the difference between the ratio $F_e/F_s$ and the estimated time delay $\hat{\delta} = \tau.F_e$. An adder 910 then sums the result of the subtraction 99 and the content 911 of a register 912 fed by the adder 910.

The content 911 is also passed to a module 913 which determines the first integer value lower than this content 911, which corresponds to $k_1$ and which feeds the ramp length generator module 96. The latter adds 1 (914) to obtain the next higher integer value, and applies a time-delay Lt to it (915) to produce $k_f$.

A subtractor 916 calculates the difference between $k_f$ and $k_1$ to supply the value 94 fed to the comparator 91.

A subtractor 917 calculates the difference between the output line 911 of the register 912 and $k_1$ and feeds it to a module 918 for calculating coefficient addresses. The latter controls a demultiplexer 919 which delivers the base addresses of the coefficients $920_0$ through $920_{Lt-1}$ for each cell.

There is claimed:

1. Device for receiving a source digital signal transmitted at one or more source symbol frequencies $F_s$, comprising:

means for sampling a received analog signal transposed into the baseband delivering an entirely demodulated sample signal, said sampling means operating at a sampling frequency $F_e$ complying with the generalized sampling condition, and a single filter module filtering said sampled signal, said filter module comprising:

a digital filter controlled by a filter coefficient vectors, and means for determining said filter coefficients according to a determination criterion based on both (i) the ratio of said sampling frequency $F_e$ to said source symbol frequency $F_s$, to interpolate said sampled signal, and (ii) an analysis of a transmission path, in order to limit interference introduced by said path.

2. Device according to claim 1 wherein said determination means comprise means for calculating a plurality of sets of filter coefficient vectors employed during initialization of said device, said sets of vectors being stored in storage means, each set of vectors corresponding to a given source symbol frequency $F_s$, and means for selecting the most effective vector from the set of vectors corresponding to the source symbol frequency $F_s$ of the signal being received, according to the value of the ratio $F_e/F_s$ and an estimate $\delta\tau$ of the transmission time-delay of said source signal.

3. Device according to claim 2 wherein said storage means comprise a random access memory.

4. Device according to claim 1 wherein said determination criterion is minimizing the mean square error.

5. Device according to claim 1 wherein said filter module comprises a series of Lt identical filter cells operating in parallel, where Lt is an integer representing a truncation length, the outputs of said filter cells being multiplexed to reconstruct the entirely demodulated digital signal.

6. Device according to claim 5 wherein each of said cells filters a portion of said sampled signal of duration Ts.Lt where Ts is the duration of a symbol of said source signal, said signal portions being offset to each other by a duration Ts.

7. Device according to claim 5 wherein the value of Lt is between 5 and 10.

8. Device according to claim 5 wherein said cells comprise accumulator means and multiplier means.

9. Device according to claim 1 wherein said filter module comprises memory means into which said sampled signal is introduced, a portion of said sampled signal being read and filtered every Ts, where Ts is the duration of a symbol of said source signal.

10. Device according to claim 1 wherein said determination means also determine the number of coefficients forming each of said filter coefficient vectors.

11. Device according to claim 1 wherein said determination means also determine the duration of the signal portion filtered by said filter module.

12. Device according to claim 1 wherein said filter module comprises:

storage means comprising $N_f$ filter coefficient vectors, and

Lt identical filter cells operating in parallel, and wherein said determination means carry out the following calculations:

$A(n)=A(n-1)+F_e/F_s+\delta_\tau(n).Fe$ $k_1(n)=VI(A(n))$ $k_j(n)=k_1(n-L_t)+1$ $J(n)=VI(N_j.(A(n)-k_1(n)))$ where:

A(n) is the value updated on each symbol a(n), ($k_j(n)$, $k_1(n)$) defines the range of the samples of said sampled signal processed to determine the decision variable relating to the symbol a(n), J(n) is the number of the coefficient vector to be used to determine the decision variable relating to the symbol a(n), and $\delta\tau$ is an estimate of the relative timing corresponding to the algebraic difference between two successive timing estimates.

13. Device according to claim 1 wherein said single filter module is controlled by a timing signal supplied by a timing estimator fed with said sampled signal.

14. Device according to claim 13 wherein said timing estimator comprises filter means using the same filter coefficient vectors as said filter module.

15. Device according to claim 14 wherein a single clock signal corresponding to a sampling clock controls said filter module and said timing estimator.

16. Device according to claim 13 wherein said timing estimator is used periodically, at time intervals that are relatively widely spaced compared to the symbol time Ts.

17. Device according to claim 1 wherein a single clock signal corresponding to a sampling clock controls said filter module.

18. Method of receiving a source digital signal transmitted at a source symbol frequency $F_s$ selected from a plurality of possible source symbol frequencies, said method being performed subsequent to sampling a received analog signal transposed into the baseband and delivering a sampled signal and prior to decoding to reconstruct said source digital signal, said sampling being carried out at a fixed sampling frequency $F_e$ complying with Shannon's sampling theorem, said method using a single filter to filter said sampled signal and to supply a filtered signal for said decoding, comprising:

an initialization step of determining a series of sets of filter coefficient vectors, each set corresponding to a given source symbol frequency $F_s$, and each vector corresponding to a given receive situation, and a step of filtering a received source signal, comprising choosing the filter coefficient vector most accurately synchronized to correct the effects of a transmission path and/or of asynchronous sampling from the set of vectors corresponding to the source symbol frequency of said source signal.

19. Method according to claim 18 wherein said initialization step comprises the following steps:

determining a template of the transmission path corresponding to interfering signals likely to be encountered, and for each source symbol frequency $F_s$:

choosing a series of timing error estimate values $\tau$, for each timing error estimate value:

formal calculation of the filter function of the transmission path, excluding said single filter, calculating the noise at the input of said single filter, calculating the square error, in a quadratic form as a function of the coefficients of said single filter, differentiating said quadratic form and searching for corresponding zeros, and storing the coefficient vectors corresponding to said zeros.

* * * * *